Dec. 11, 1951  R. W. SHAW  2,577,818
DEEP SMOOTH SURFACE FINISHING PROCESS
Filed Aug. 18, 1947  2 SHEETS—SHEET 1

INVENTOR.
RICHARD W. SHAW
BY Wade Koontz
ATTORNEY
H. H. Losch
AGENT-

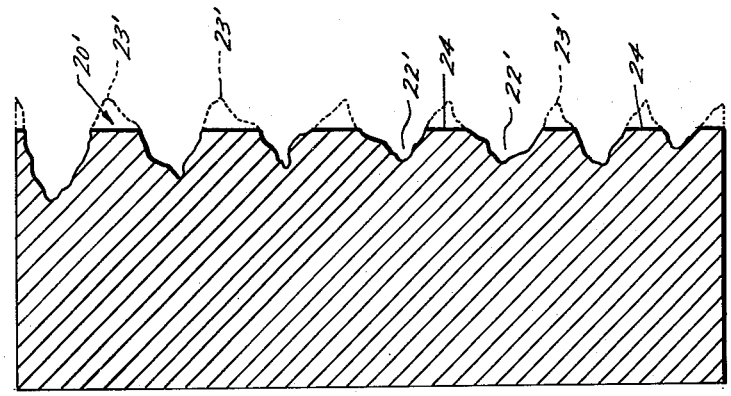
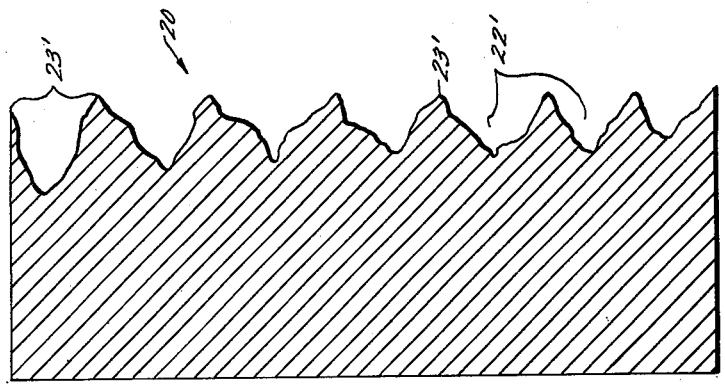
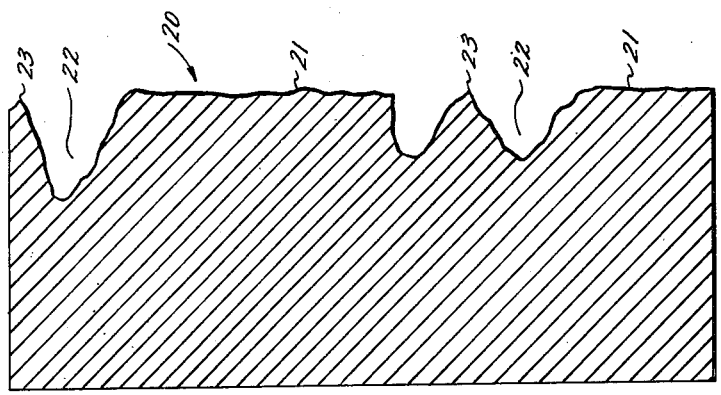

Patented Dec. 11, 1951

2,577,818

UNITED STATES PATENT OFFICE 2,577,818

DEEP SMOOTH SURFACE FINISHING PROCESS

Richard Woodside Shaw, Dayton, Ohio

Application August 18, 1947, Serial No. 769,287

2 Claims. (Cl. 51—290)

(Granted under the act of March 3, 1883, as amended April 30, 1928; 370 O. G. 757)

The invention described herein may be manufactured and used by or for the Government for governmental purposes without payment to me of any royalty thereon.

The present invention relates to a method of producing a deep-smooth finish on metallic bearing surfaces by successive steps of lapping with varying sizes and types of abrasives of definite specification so as to produce a relatively deep and cavernous or pitted surface to retain a relatively large amount of lubricant, the peaks of the pitted surface being smooth to the touch and resisting metal to metal abrasion to a high degree thereby minimizing wear and providing long life as a bearing surface.

The problem of obtaining the proper bearing finish appears to be most acute for pistons and cylinders of reciprocating engines since these two members have substantially hard metal cooperating surfaces as cast iron to steel, steel to steel or cast iron to cast iron chiefly through piston ring engagement. The machining or turning process leaves a substantially rough microscopic surface which, upon bringing two such surfaces together in sliding motion as a piston and cylinder bearing, results in metal abrasion that causes scuffing and scoring. The peaks of the roughened surface, upon run-in of an engine having such pistons and cylinder walls, will be broken off or bent which greatly prolongs the running-in period as well as contaminates flowing lubricant and further promotes metal abrasion during the running-in process.

It appears to be the general practice in preparing reciprocating type engines for service to run-in such engines for several hours with an engine oil or a special run-in oil which is necessary to provide a running finish. After such running-in, scoring and scuffing are not likely to result and the engine may be placed in service. However, it may be seen that conditioning an engine in this manner is not only crude and the bearing surfaces imperfect, but that optimum clearance tolerance can not be achieved.

In the present invention the bearing surfaces are rough lapped and then fine lapped with particular lapping compounds that imparts a smooth surface in the order of 1 to 3 R. M. S. (root mean square) to the peaks of the bearing surface leaving the valleys or pits untouched for lubricant deposit. As in the case of a piston and cylinder, a closer operating tolerance can be achieved after the lapping operation is completed resulting in better engine performance in service. In surface finishing technology the use of a number followed by the abbreviation R. M. S. always signifies that the root mean square characteristic of the surface contour is expressed in micro-inches.

It is a primary object of my invention to provide a method of producing a deep-smooth finish to a metallic bearing surface.

It is another object of this invention to provide a method of lapping cooperating bearing surfaces in successive steps using a lapping compound of particular ingredients for each step to produce a deep-smooth finish on the bearing surfaces.

It is still a further object of this invention to provide a compound for rough lapping and a compound for fine lapping of a machined piston and cylinder bearing surface in a particular manner to produce a deep-smooth finish bearing surface in which the lapped surface portions have been pitted and peaks and feather edges have been cut partially away to a relatively smooth surface leaving the pits to retain lubricant.

Other objects and advantages will become apparent to those skilled in the art as the description proceeds and taken in conjunction with the accompanying drawings, in which:

Fig. 3 illustrates a highly magnified cross-sectional view of a machined or honed surface as illustrated in Fig. 2;

Fig. 4 illustrates a highly magnified cross-section of the surface of Fig. 3 after being rough lapped in accordance with this invention;

Fig. 5 illustrates the same surface in cross-section as shown in Fig. 4, likewise highly magnified, which has been fine lapped in accordance with this invention, the cutaway portion being represented in dotted lines.

Figure 1:
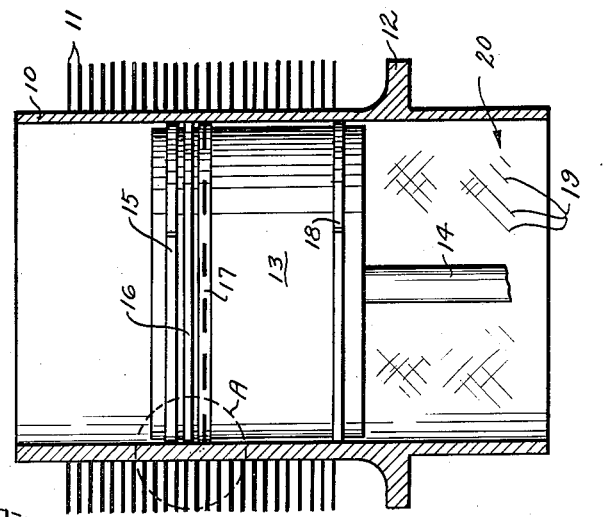
Fig. 1 shows a piston in a cylinder that is longitudinally sectioned.

Referring more particularly to Fig. 1, there is shown, for the purpose of illustration, a reciprocating engine cylinder 10 of the air cooled type ordinarily found in use in aircraft engines having cooling fins 11 and flange 12 for holding the cylinder to an engine block (not shown). A piston 13, reciprocable in the cylinder 10 by a connecting rod 14 operatively associated with a crankshaft of an engine (not shown), has conventional piston rings 15, 16, 17 and 18 thereon.

Figure 2:
Fig. 2 illustrates an enlarged size face view of a portion of a machined or honed surface, as a cylinder wall portion of Fig. 1.
Figure 1A:
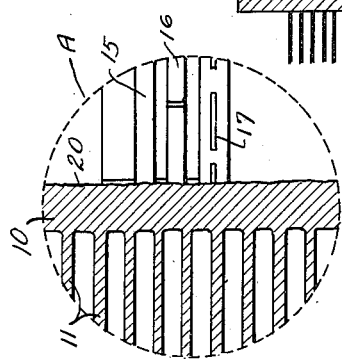
Fig. 1a is a magnified cross sectional view of the portion of Fig. 1 within the circle A.

Referring to Figs. 2 and 3 along with Fig. 1, the cylinder 10 has been machined in the ordinary manner and honed for conditioning the cylinder for use. The honing operation forms cross hatched scratches in the inner surface of the cylinder which are represented by 19, better seen in enlarged size in Fig. 2. This surface, while it has the appearance of being substantially smooth, is actually rough in the order of 15 to 20 R. M. S. as better seen in the circle A (see Fig. 1a) and indicated generally as 20 although the surface roughness in Fig. 1a is somewhat exaggerated. The character of the surface 20 is better understood by observing Fig. 3 in which it may be seen that the top surface 21 has grooves or pits 22 cut therein that are formed by irregularities in the cutting or honing tools. These grooves or pits are formed at random which leave unpredictable extensive surfaces 21 and peaks or feather edges 23.

It has been found in general practice that when two such surfaces meet to provide a frictional bearing, as a piston and cylinder (the machined surface of pistons and rings being substantially the same as that illustrated in Fig. 3), considerable scuffing and scoring result. The feather edges of one surface will slip into the grooves or pits 22 of the companion surface and be broken off or bent upon sliding onto the surfaces 21 since there is no known lubricant that can actually hold these sharp edges away from the companion surface and consequently these feather edges will cause cutting. Then too, the surfaces 21 are too extensive to permit proper lubrication. A substantially optically smooth surface that is greater than about 0.040 of an inch across and used as a bearing with a similar surface will not obtain proper lubrication resulting in metal abrasion. Such surfaces must have pits and depressions in close proximity to act as small lubricant reservoirs for small top surfaces. The lubricant held in the pits or depressions is dragged along the surfaces by relative movement of the parts, but where the top surfaces are more than about 0.040 of an inch in extent the lubricant becomes exhausted and there results actual metal to metal contact causing metal abrasion which produces scuffing and scoring of the cooperating parts. The piston rings have knife edges that actually cut the lubricant down the cylinder wall and these rings must depend on lubricant retained along the cylinder wall surface to lubricate the engaging surfaces.

In accordance with the present invention such a bearing surface as 20, which is usually found to be rough in the order of 15 to 20 R. M. S., is rough lapped to form a substantially rough surface in the order of 40 to 50 R. M. S. as illustrated in Fig. 4. As seen in this figure the whole surface 20 has been roughened such that pits or depressions 22' are continuous along the surface forming, as well, many sharp peaks and feather edges 23'. The rough lapping composition which I have found suitable for this purpose consists of:

Two parts oil mix aluminum oxide-240 grit lapping compound
1 part oil mix aluminum oxide-320 grit lapping compound
3 parts kerosene.

It has been found that about 200 lapping cycles are suitable although the number of lapping cycles may be changed to meet the conditions of the machined bearing surfaces.

After the coarse lapping operation, the parts are cleaned in a cleaning fluid, soap and water. The bearing surfaces, which are illustrated herein as a piston and cylinder bearing surface, are lapped the second time with a fine lapping compound such as a polishing compound which consists of:

5 parts extra fine pumice
3 parts paraffin oil such as floor oil.

This lapping or polishing operation is continued until the surface finish, as measured with a profilometer, has been decreased by 20 per cent to 70 per cent. It has been found that approximately 150 lapping cycles are required to obtain this result. After cleaning the parts, the cylinder and piston are ready for use.

The polishing operation produces a surface with the peak top surfaces smooth in the order of 1 to 3 R. M. S. as shown in Fig. 5 in which the peaks and feather edges 23' have been polished away to small "top surfaces" 24 that are all on the surface of revolution. The pits or depressions 22' are left to retain lubricant and the top surfaces are very small areas averaging less than 0.040 of an inch in any direction such that the bearing surface consists of a multiple of very small relatively smooth surfaces that are adapted to be well lubricated by lubricant retained in adjacent pits and depressions 22'. Since the lubricant film can be maintained over the entire area of each of the small top surfaces 24, there is no metal abrasion to cause scuffing and scoring.

Figure 6:
Fig. 6 illustrates an enlarged size face view of a deep-smooth surface made in accordance with this invention.

The bearing surface having small top surfaces separated by pits or depressions functions to provide a relatively large smooth area interspersed with lubricant retaining depressions and the entire bearing surface is referred to in this description as a "deep-smooth" surface. A face view of such a "deep-smooth" surface in enlarged size may best be seen in Fig. 6 in which it may be understood that the many top bright bearing surfaces (24) are better lubricated by lubricant held in the dark pits and depressions (22') relative to the top bright bearing surfaces (21) illustrated in Fig. 2.

A dummy piston may be used in processing the cylinder and the piston may be processed in a dummy cylinder in accordance with this invention, or the piston and cylinder may be processed by lapping them together as described and as desirable to obtain suitable tolerance.

The lapped surface will be a deep-smooth surface that may be placed in service after a very short running-in period to mate the bearing surfaces with minute irregularities. By obtaining a deep-smooth finish on such bearing surfaces as the pistons and the cylinder walls of an engine before assembly, metal abrasion is reduced to a minimum or eliminated altogether and there is little or no metal dust to scuff or score bearing parts. Initially processing such bearing surfaces as pistons, including the piston rings, and cylinder walls in the manner described prolongs engine life and reduces the probability of engine failure.

It has been found desirable to process the cylinder bores and the piston rings in the manner described herein and to process the pistons in the manner described in my copending application Serial No. 769,286, filed August 18, 1947, now abandoned.

While I have illustrated how my invention may be practiced in conditioning a piston or cylinder for internal combustion engines, it is to be understood that various means and uses will present themselves and I desire to be limited only by the scope of the appended claims.

I claim:

1. A method of producing a deep-smooth bearing surface on machined steel bearing elements comprising, lapping the bearing surface with a mixture of coarse grit lapping compound, oil mix aluminum oxide and kerosene for about 200 lapping cycles to produce a plurality of closely related peaks each having a mean cross-sectional dimension not exceeding 0.040 of an inch providing a surface roughness in the order of 40 to 50 R. M. S., and lapping said bearing surface with a fine lapping compound consisting of extra fine pumice and oil for about 150 lapping cycles until a smooth substantially flat bearing surface portion not exceeding 0.040 of an inch in any direction is provided on each peak having a surface roughness in order of 1 to 3 R. M. S.

2. A method of producing a deep-smooth finish on machined bearing surfaces of hardened steel bearing elements comprising, lapping the machined bearing surface with a rough abrasive consisting of two parts oil mix aluminum oxide-240 grit lapping compound, 1 part oil mix aluminum oxide-320 grit lapping compound and 3 parts kerosene for about 200 lapping cycles for cutting a plurality of contiguous pits and depressions interspersed with a plurality of peaks having a mean cross-section dimension of each peak not exceeding 0.040 of an inch on said bearing surface to produce a bearing surface roughness in the order of 40 to 50 R. M. S., and lapping said bearing surface with a mixture of 5 parts extra fine pumice and 3 parts paraffin oil until said peaks each have a relatively smooth top surface portion smooth in the order of 1 to 3 R. M. S. not exceeding 0.040 of an inch in extent in any direction whereby small lubricant reservoirs are provided not more than 0.040 of an inch apart separated by the smooth top surface portions of said peaks.

RICHARD WOODSIDE SHAW.

REFERENCES CITED

The following references are of record in the file of this patent:

UNITED STATES PATENTS

| Number | Name | Date |
|--------|------|------|
| 570,431 | Biddle | Oct. 27, 1896 |
| 1,180,514 | McCormack et al. | Apr. 25, 1916 |
| 1,682,420 | Rolf | Aug. 28, 1928 |
| 1,801,314 | Landolt | Apr. 21, 1931 |
| 2,434,880 | Bramberry | Jan. 20, 1948 |

OTHER REFERENCES

"The Story of Superfinish" by Swigert, published by Lynn Publishing Company, Detroit, Michigan, page 304 relied upon. (Copy in Div. 58.)